United States Patent [19]

Blechen

[11] Patent Number: 5,299,765
[45] Date of Patent: Apr. 5, 1994

[54] APPARATUS AND METHODS FOR CONTROLLING AIRCRAFT THRUST DURING A CLIMB

[75] Inventor: Frederick C. Blechen, Redmond, Wash.

[73] Assignee: The Boeing Company, Seattle, Wash.

[21] Appl. No.: 811,724

[22] Filed: Dec. 23, 1991

[51] Int. Cl.$^5$ .............................................. G05D 1/08
[52] U.S. Cl. ................................... 244/182; 244/188; 244/195
[58] Field of Search ............... 244/178, 180, 182, 186, 244/188, 194, 195; 364/427, 431.01, 433

[56] References Cited

U.S. PATENT DOCUMENTS

| | | | |
|---|---|---|---|
| 3,586,268 | 6/1971 | Melvin | 244/182 |
| 3,691,356 | 9/1972 | Miller | 244/182 |
| 3,908,934 | 9/1975 | Schloeman | 244/182 |
| 4,019,702 | 4/1977 | Annin | 244/180 |
| 4,471,439 | 9/1984 | Robbins et al. | 244/182 |
| 4,589,616 | 5/1986 | Zweifel | 244/188 |
| 4,662,171 | 5/1987 | Jackson et al. | 364/427 |

Primary Examiner—Michael S. Huppert
Assistant Examiner—Anne E. Bidwell
Attorney, Agent, or Firm—R. H. Sproule

[57] ABSTRACT

A controller for automatically controlling aircraft thrust during a noise abatement climb operates so as to smoothly reduce aircraft thrust during a reduction in aircraft climb angle at the noise abatement altitude so as to maintain a selected noise abatement climb gradient dependent upon the pilot maintaining a recommended climb airspeed. The selected noise abatement climb gradient is compared with a measured climb gradient to generate an error term. The measured climb gradient is adjusted by a acceleration correction term in order to make the resulting measured climb gradient term independent of airspeed changes. The climb gradient error term is added to the selected climb gradient to generate a commanded climb gradient which is converted to an equivalent thrust (noise abatement thrust). The resulting noise abatement thrust is compared with measured engine thrust to generate an error term for controlling engine thrust so that the aircraft follows the noise abatement climb gradient.

9 Claims, 2 Drawing Sheets

APPARATUS AND METHODS FOR CONTROLLING AIRCRAFT THRUST DURING A CLIMB

TECHNICAL FIELD

The present invention relates to apparatus and methods for controlling aircraft engine thrust.

BACKGROUND OF THE INVENTION

A number of airports in the United States require airplanes to follow noise abatement procedures when taking off and climbing out. Typically, these procedures require a steep climb to a designated altitude. During the climb the pilot flies at a recommended airspeed which is a function of aircraft weight and flap setting. This steep climb is followed at the designed altitude by a sharp reduction in thrust and climb angle to achieve a minimum required climb gradient (and recommended airspeed) until the airplane is out of the noise abatement area. In this manner the airplane traverses the noise abatement area at a maximum altitude and minimum thrust level so that the perceived noise on the ground is minimized.

Previously, during the time the aircraft was transitioning from the steep climb angle/high thrust mode to the relatively shallow climb angle/low thrust mode, the pilot simply estimated the throttle position necessary to maintain the required airspeed and climb gradient. Typically, this procedure involved manually readjusting the throttle position and aircraft pitch attitude several times by trial-and-error before the correct throttle position and pitch attitude was finally reached.

Due to the time and effort involved in determining the correct throttle position, it is preferable that the throttle be positioned automatically during this transition to avoid the aforementioned trial and error procedure and to allow the pilot to direct his attention to other matters.

Conventionally, a number of autothrottle devices have been disclosed. For example, U.S. Pat. No. 4,019,702 by Annin (assigned to the assignee of the present application) discloses a pilot guidance system that displays pitch and speed commands during takeoff climb for engine noise abatement purposes.

Furthermore, U.S. Pat. No. 4,662,171 by Jackson et al (assigned to the assignee of the present application), the contents of which is incorporated by reference herein in its entirety, discloses an autothrottle control system for automatically increasing the thrust of a working engine(s) of an aircraft if power is lost on a different engine while the aircraft is operating at reduced thrust during a takeoff noise abatement maneuver.

These conventional devices, however, do not automatically position the throttle to maintain a selected climb gradient when the pilot is making a reduction in pitch attitude.

SUMMARY OF THE INVENTION

It is therefore an object of the present invention to provide a system for controlling aircraft thrust during a noise abatement climb.

It is another object of the present invention to provide an autothrottle control system for adjusting throttle position during a change in aircraft pitch attitude to maintain a predetermined climb gradient.

More specifically, the present invention pertains to a method for adjusting aircraft engine thrust. The method includes the steps of selecting a gradient for climbing the aircraft. The method also includes the steps of flying the aircraft at a first climb attitude. This is followed by the steps of reducing the pitch attitude of the first climb attitude to a second climb attitude, and then automatically adjusting the engine thrust during this pitch attitude reduction so that during a second climb segment the aircraft climbs at the selected climb gradient while flying at the selected airspeed.

BRIEF DESCRIPTION OF THE DRAWINGS

The present invention will be discussed in more detail in the following Detailed Description, in conjunction with the drawings, in which.

DETAILED DESCRIPTION

The present invention operates to automatically reduce aircraft thrust when a pre-selected noise abatement altitude has been reached after takeoff. The present invention then controls engine thrust so that if the pilot maintains a "recommended" climbout airspeed, the aircraft automatically tracks a selected noise abatement climb gradient. This recommended climbout airspeed (usually $V_2 + 15$ knots) is a function of aircraft weight and flap setting and is independent of noise abatement considerations.

In a typical takeoff situation at an airport which has noise abatement procedures in effect, upon liftoff from the runway a maximum climb angle is maintained at the recommended climbout airspeed. Upon approaching the required noise abatement altitude, which typically is around 1000 feet above ground level (AGL), the pilot is required to decrease the aircraft thrust and climb attitude in order to fly a minimum climb angle.

Upon nearing the noise abatement altitude, the present control system starts reducing engine thrust to a level necessary to maintain the noise abatement climb gradient at the recommended climbout airspeed. In an exemplary embodiment, by observing the aircraft airspeed displayed on the aircraft flight director, the pilot simply adjusts the control column to maintain the recommended climbout airspeed. In this manner, the pilot need only reduce the pitch attitude of the aircraft by operation of the control column. At the same time the control system of the present invention operates to automatically reduce the thrust of the aircraft engine so as to maintain the preselected noise abatement climb gradient (typically between one and two percent). In another exemplary embodiment, the aircraft pitch attitude control (and airspeed control through pitch attitude adjustments) is accomplished in a conventional manner by the aircraft autopilot system.

Figure 1:
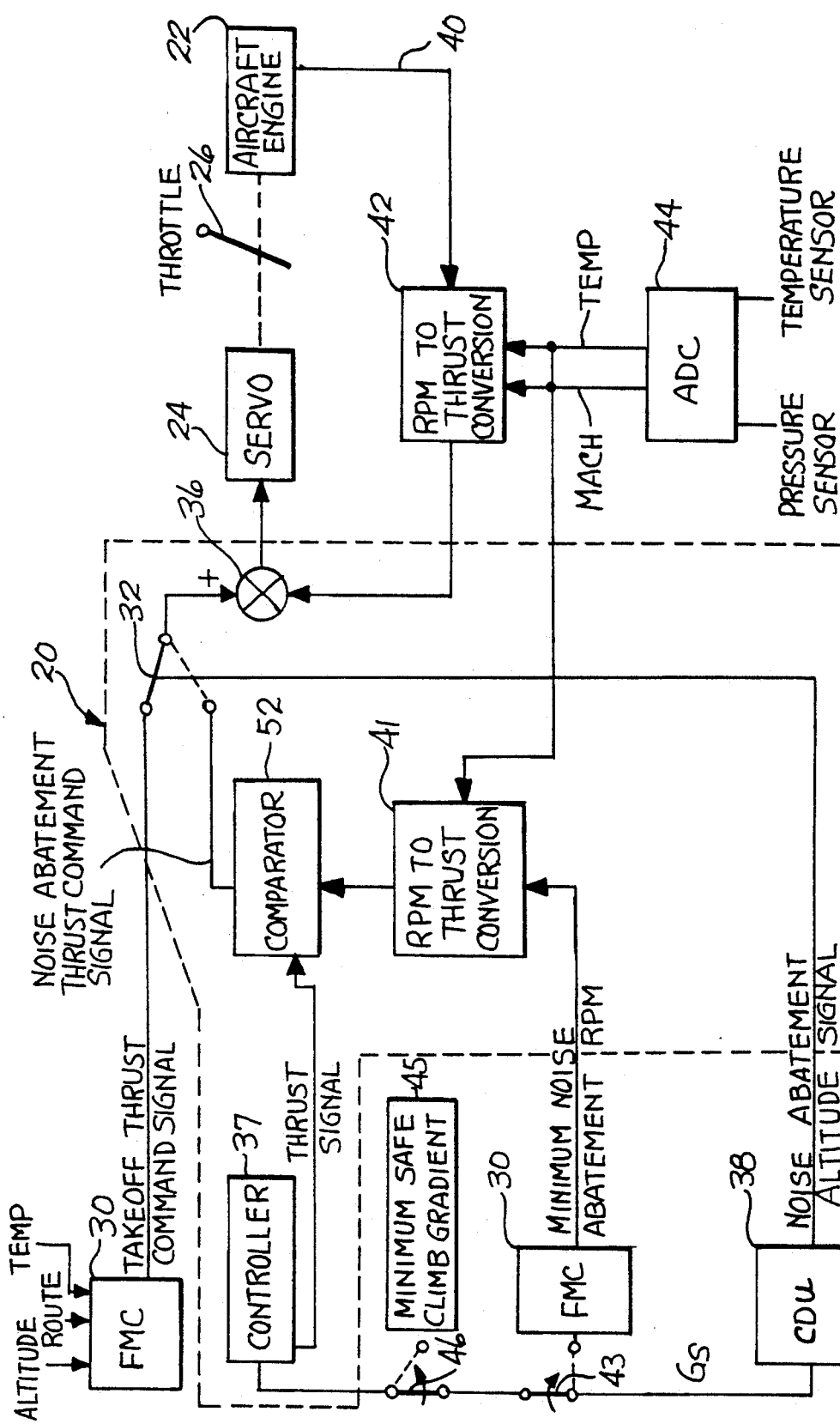
FIG. 1 is a block diagram showing the control system of the present invention.

In order to describe the present invention, reference is made first to FIG. 1, which shows the control system of the present invention, generally indicated at 20, for regulating the thrust output of a conventional aircraft engine 22. The control system outputs a signal to a conventional throttle servo 24 which automatically positions a conventional throttle 26 which in turn is linked to the engine 22 in a conventional manner. In operation, when the aircraft reaches the noise abatement altitude, a noise abatement command signal generated by the control system 20 causes the throttle to be automatically positioned so that predetermined noise abatement climb gradient is maintained.

In an exemplary embodiment, reference to conventional components in this detailed description shall refer to components presently installed aboard Boeing model 737-300/400/500 airplanes. In this exemplary embodiment, the control system 20 is implemented in a conventional autothrottle digital computer.

In the present invention, during initial climbout from an airport, a conventional takeoff thrust command signal is output from a conventional flight management computer 30 (FIG. 1). The FMC 30 stores assigned route of flight, assigned altitudes, and temperature information, and from this information generates the takeoff thrust command signal in a conventional manner. The takeoff thrust command signal is fed into the control system 20 through a switch 32, which in turn is followed by a subtractor 36, before proceeding on to the throttle servo 24. With the switch 32 in the solid line "up" position shown in FIG. 1, the noise abatement autothrottle is inactive and operation as just described is purely conventional.

However, on approaching the pre-selected noise abatement altitude and with the control system activated, the switch 32 moves to the "down" position shown in dashed lines (FIG. 1) which permits a noise abatement thrust signal (instead of the takeoff thrust command signal) to be fed to the throttle servo 24. In the present invention, the noise abatement thrust signal is generated by a controller 37 to be described later.

In an exemplary embodiment, the selected noise abatement altitude and selected climb gradient ($G_s$) are entered by the pilot at a conventional control display unit (CDU) 38 located in the airplane cockpit. The control display unit 38 includes a display screen and alphanumeric keypad (both not shown) which permits manual selection of a takeoff data page where the pilot may enter the noise abatement altitude and selected climb gradient prior to takeoff.

Still referring to FIG. 1, the position of throttle 26 is regulated by an error feedback loop 40 which includes an engine RPM-to-thrust converter 42. During operation of converter 42, an engine RPM signal which is output from an engine sensor (not shown) is converted to a thrust signal for subtraction from the takeoff thrust command or noise abatement thrust command (depending upon the position of switch 32) at the subtractor 36. Conversion of engine RPM to thrust is accomplished using known equations and is a function of airplane mach number and outside air temperature which are obtained from a conventional air data computer 44 using signals from conventional temperature and pressure sensors.

In the present embodiment, the control system 20 has two possible modes of operation. In a first mode, the selected climb gradient ($G_s$) signal from CDU 38 is fed through a switch 43 which when in the dotted line position (in FIG. 1) sends the ($G_s$) signal to FMC 30 where it is converted in a conventional manner) using lookup tables which include airplane gross weight, temperature and airport pressure altitude) to an engine RPM signal. This RPM signal is then converted to a thrust value at an RPM-to-thrust converter 41. In order to override the noise abatement thrust signal (from block 44) in the event it is too low for safe airplane operation, a minimum safe climb gradient value is stored at a memory block 45. The minimum safe climb gradient signal is fed through a switch 46 (which is in the dotted line position) to the controller 37 where it is converted to a minimum safe thrust signal (in a manner to be described later). The noise abatement thrust value is compared to the minimum safe thrust signal generated from the controller 37 at a comparator 52 and the larger value is fed to the switch 32.

In a preferred mode of operation, switches 43 and 46 are hardwired in the solid line positions shown in FIG. 1. In this mode of operation, the selected climb gradient $G_s$ is fed directly to the controller 37 which computes the required thrust in a manner to be described later. The resulting required thrust signal is fed through the comparator 52 to the switch 32.

In order to describe the controller 37 (for generating the noise abatement thrust signal or minimum safe thrust signal) in more detail, the following is provided. In an exemplary embodiment, the controller 37 is a software program stored in the conventional autothrottle computer. The controller 37 operates by generating either the noise abatement thrust signal or the minimum safe thrust signal in the form of a predicted thrust ($T_p$) required for maintaining the selected climb gradient ($G_s$) or the minimum safe climb gradient, as the case may be. For ease of explanation, the operation of controller 37 will be discussed with reference to the generation of a noise abatement reference thrust signal as a function of the selected climb gradient signal ($G_s$), however generation of a minimum safe thrust signal as a function of the minimum safe climb gradient signal occurs in an identical manner.

More specifically, predicted thrust ($T_p$) is computed by the equation $$T_p = G_s \times C_l + C_d \times q S_A, \quad (1)$$

where $C_l$ is the airplane's coefficient of lift, $C_d$ is the airplane's coefficient of drag, q is dynamic pressure, and $S_A$ is the airplane total wing surface area (a constant value which is stored in the controller 37 for the specific aircraft of interest). In equation #1, $C_l$ is determined by the equation $$C_l = (W/\cosine P)/q S_A, \quad (2)$$

where W is the weight of the aircraft, and P is the current bank angle of the aircraft. In an exemplary embodiment, the weight of the aircraft is entered by the pilot at the CDU 38, and P is obtained from a conventional inertial reference unit (IRU) 53 (FIG. 2) aboard the aircraft. Furthermore, the value of q is equation #2 is determined by the equation $$q = \text{rho} \times V_{eq} \times V_{eq}, \quad (3)$$

where rho is sea level air density (a constant stored in the controller 37) and $V_{eq}$ is airplane equivalent airspeed which is conventionally output from the air data computer (ADC) 44.

Figure 2:
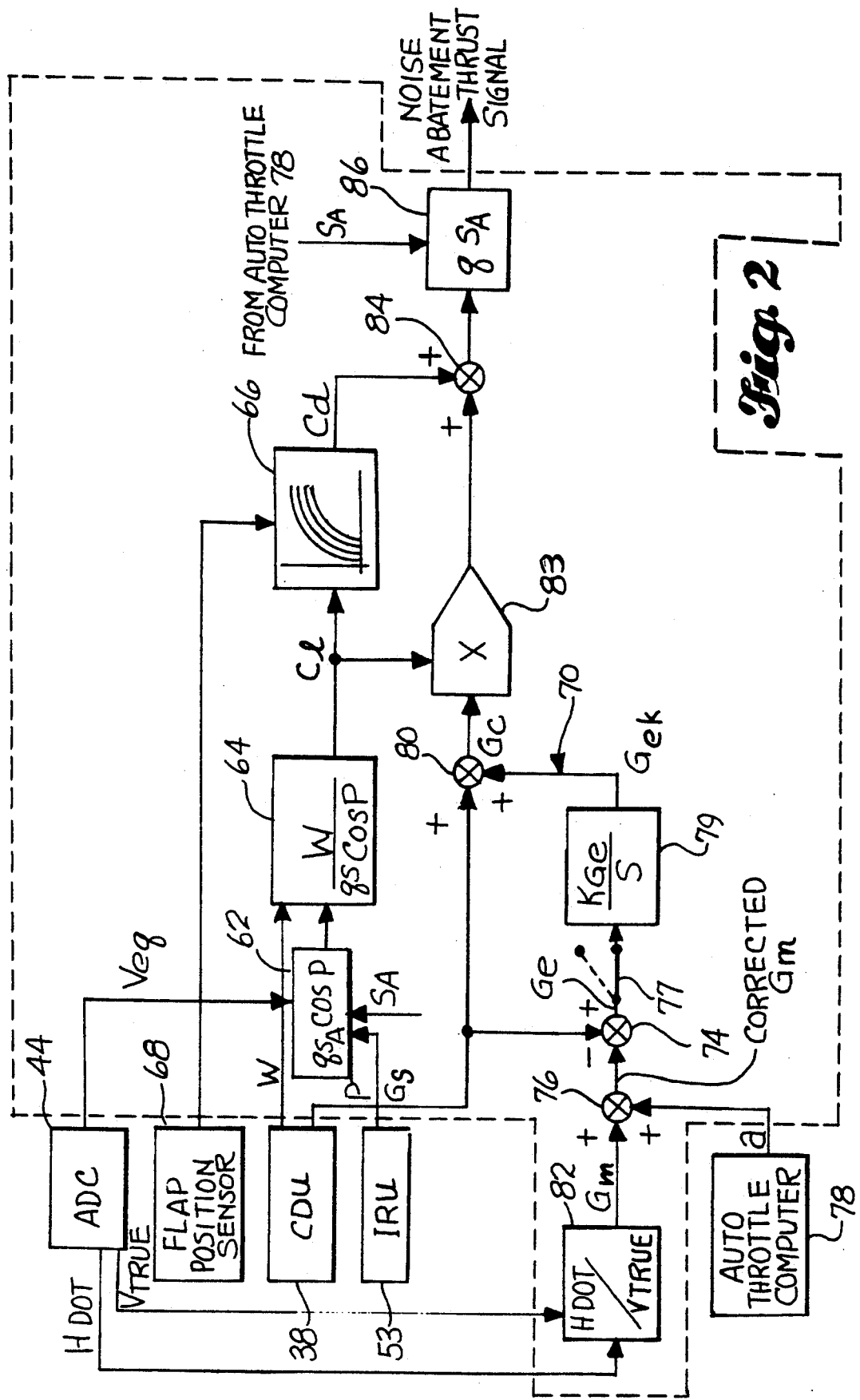
FIG. 2 is a block diagram showing a controller portion of the control system of the present invention.

Referring now to FIG. 2 which shows the controller 37 in more detail, the quantity $q S_A \cos P$ is calculated at a multiplier 62 and the resulting product is divided into airplane weight at a divider 64 to obtain $C_1$. On the other hand, the coefficient of drag, $C_d$, is obtained from a drag polar lookup table 66 which contains values of $C_d$ as functions of airplane coefficient of lift $C_l$ for various flap settings (obtained from a conventional flap position flap settings (obtained from a conventional flap position flap settings (obtained from a conventional flap position sensor 68). In the present invention, the values of $C_d$ are obtained from drag polars (referenced to an airplane in level flight). However, these drag polars are used to generate values of $C_d$ for an airplane in a slight climb.

In order to compensate for any error in the selected noise abatement climb gradient due to, for example, inaccuracies in the drag polars, an error loop indicated at 70 is provided. In the error loop 70 an error term $G_e$ (sometimes known as potential gamma) is generated by subtracting (at a subtractor 74) from the selected noise abatement climb gradient ($G_s$) a sum equal to the measured climb gradient ($G_m$) plus an acceleration term (a). The purpose of the acceleration term is to assist the aircraft in flying a constant climb gradient by making $G_e$ independent of any aircraft airspeed changes due to aircraft maneuvering. That is, during the climbout the pilot controls the airspeed by adjusting the pitch attitude of the aircraft. The present controller operates to adjust the aircraft thrust so that the aircraft follows the selected noise abatement climb gradient. The acceleration correction term (a) would not be necessary if the pilot flew the climb at exactly the recommended climb airspeed. However, if there were no acceleration correction term and the pilot did not exactly hold the recommended climb airspeed, the error term $G_e$ instead of converging to zero, could, in fact, diverge so that the aircraft would not follow the selected climb gradient.

More specifically, if on climbout the aircraft deviates from the selected climb gradient by flying a steeper climb gradient, the aircraft will decelerate (negative acceleration). In the present invention, the negative acceleration term (−a) is added to the steeper measured climb gradient ($G_m$) at adder 76 so that the resulting "corrected" measured climb gradient (fed to subtractor 74) is reduced to what the measured climb gradient would have been had the pilot maintained the recommended climb airspeed.

On the other hand, in the event the aircraft deviates from the selected climb gradient (due to deviation from the recommended airspeed) by flying a shallower climb gradient, the aircraft will accelerate. This positive acceleration term (a) is added to the shallower measured climb gradient ($G_m$) so that the corrected measured climb gradient is equal to what the measured climb gradient would have been had the pilot maintained the recommended climb airspeed.

In the present embodiment, the measured aircraft acceleration (a) is a conventional output from a conventional autothrottle computer 78 and is equal to the aircraft body axis acceleration minus pitch attitude which has been scaled using a convenient scalar such as radians or feet per second.

In addition, the measured climb gradient $G_m$ is calculated at a divider 82 by the equation $$G_m = H_{dot}/V_{true}, \quad (5)$$

where $H_{dot}$ is the aircraft rate of climb which is a conventional output from the air data computer (ADC) 44 and $V_{true}$ is the true aircraft airspeed which is also a conventional output from the air data computer 44.

In the present error loop 70, the error term $G_e$ from subtractor 74 is sent through a switch 77 to a $K_{Ge}/s$ integrator 79 (where $K_{Ge}$ is the gain constant and s is a Laplace operator) having a gain of about 0.01. Switch 77 is moved to the solid line closed position (as shown in FIG. 2) in response to a signal from CDU 38 when the airplane reaches the noise abatement altitude. The purpose of switch 77 is to avoid initiating integrator 79 prior to calculating the proper value of $G_e$, or in other words, before the aircraft has settled on the noise abatement climb gradient. The gain of integrator 79 is chosen so that the error term is slowly corrected without substantially affecting the dynamics of the error loop. The resulting adjusted error term $G_{ek}$ is added to the selected climb gradient $G_s$ (from CDU 38) at an adder 80 to generate a commanded climb gradient term ($G_c$).

In order to calculate noise abatement thrust $T_n$, it is known that $$T_n = G_c \times W/\cos P + D \quad (6)$$

where D = total airplane drag. Furthermore, $$T_n/qs = G_c \times C_l + C_d \quad (7)$$

since $C_l = W/\cos p$ and $C_d = D/qS$. Therefore, $$T_n = (G_c \times C_l + C_d) \times qS. \quad (8)$$

Referring back to FIG. 2, the term $G_c \times C_l$ of equation #7 is generated at a multiplier 83 (downstream of adder 80). The resulting product from multiplier 83 is added to $C_d$ (from lookup table 66) at an adder 84, and the resulting sum is multiplied by the product $qS_A$ at a downstream multiplier 86 to generate the noise abatement thrust signal for use as previously described with reference to FIG. 1.

The present invention includes a method of adjusting aircraft engine thrust. This method includes the steps of selecting a climb gradient, such as a noise abatement climb gradient, for climbing the aircraft, flying the aircraft at a first climb attitude during a first climb segment, and then reducing the climb attitude of the aircraft at the end of the first climb segment from the first climb attitude. In addition, the aircraft is flown at a selected airspeed during a second climb segment and the engine thrust is automatically adjusted during the climb attitude reduction so that the aircraft climbs at the selected climb gradient during the second climb segment.

During the step of automatically adjusting the engine thrust, a reference thrust level is determined which is a function of the selected climb gradient. In addition, an actual thrust level of the engine is sensed and the actual engine thrust level is compared with the reference thrust level. The actual thrust level is adjusted so that the actual thrust level approaches the reference thrust level.

In determining the reference thrust level, a first value is determined which is a function of the selected climb gradient and a second value is determined which is a function of a measured climb gradient of the aircraft. A difference between the first value and the second value is determined to generate an error value. The error value is converted to a thrust value which is the reference thrust level.

The error value is converted to a thrust value by combining the error value with the first value to generate a third value, and by multiplying the third value by a value which is a function of a coefficient of lift value for the aircraft so as to generate a fourth value. The fourth value is combined with a value which is a function of a coefficient of drag value for the aircraft.

In determining the second value, an acceleration value and a climb gradient of the aircraft are determined. The acceleration value and the climb gradient value are combined to generate the second value which is independent of aircraft airspeed changes.

In an exemplary embodiment, the step of automatically adjusting engine thrust during the climb attitude reduction also includes determining a minimum climb gradient value, comparing the minimum climb gradient value with the thrust level value and selecting one of the two values which is largest so as to generate the reference thrust level. In addition, an actual thrust level of the engine is sensed and the actual engine thrust level is compared with the reference thrust level. The actual thrust level is adjusted so that the actual thrust level approaches the reference thrust level.

What is claimed is:

1. Method for adjusting aircraft engine thrust, the method comprising the steps of:
   a. selecting a climb gradient for climbing the aircraft;
   b. flying the aircraft at a first climb attitude during a first climb segment;
   c. reducing a climb attitude of the aircraft at an end of the first climb segment from the first climb attitude;
   d. flying the aircraft at a selected airspeed during a second climb segment;
   e. measuring a climb gradient of the aircraft;
   f. determining a reference thrust level by (1) determining a first value which is a function of the selected climb gradient. (2) determining a second value which is independent of aircraft airspeed changes by determining an acceleration value of the aircraft and combining the acceleration value and the measured climb gradient, (3) determining a difference between the first value and the second value to generate and error value, and (4) converting the error value to a reference thrust level;
   g. sensing an actual thrust level of the engine; and
   h. adjusting the actual thrust level of the engine so that the actual thrust level approaches the reference thrust level during the climb attitude reduction so that the aircraft climbs at the selected climb gradient during the second climb segment.

2. The method as set forth in claim 1 additionally comprising the step of flying the aircraft at the selected airspeed during the first climb segment.

3. The method as set forth in claim 1 wherein the selected climb gradient is a noise abatement climb gradient.

4. The method as set forth in claim 1 wherein the step of converting the error value to the reference thrust level includes the steps of:
   a. combining the error value with the first value to generate a third value;
   b. multiplying the third value by a value which is a function of a coefficient of lift value for the aircraft so as to generate a fourth value;
   c. multiplying the fourth value by a fifth value; and
   d. combining the fifth value with a value which is a function of a coefficient of drag value for the aircraft.

5. The method as set forth in claim 1 wherein the reference thrust level determining step includes the steps of:
   a. determining a minimum climb gradient value; and
   b. comparing the minimum climb gradient value with the thrust level value and selecting one of the two values which is largest so as to generate the reference thrust level.

6. Apparatus for adjusting aircraft engine thrust, the apparatus comprising:
   a. means for selecting a climb gradient for climbing the aircraft;
   b. means for flying the aircraft at a first climb attitude during a first climb segment;
   c. means for reducing a climb attitude of the aircraft at an end of the first climb segment from the first climb attitude;
   d. means for flying the aircraft at a selected airspeed during a second climb segment;
   e. means for measuring a climb gradient of the aircraft;
   f. means for determining a reference thrust level including (1) means for determining a first value which is a function of the selected climb gradient, (2) means for determining a second value which is independent of aircraft airspeed changes by determining an acceleration value of the aircraft and combining the acceleration value and the measured climb gradient, (3) means for determining a difference between the first value and the second value to generate an error value, and (4) means for converting the error value to a reference thrust level;
   g. means for sensing an actual thrust level of the engine; and
   h. means for adjusting the actual thrust level of the engine so that the actual thrust level approaches the reference thrust level during the climb attitude reduction so that the aircraft climbs at the selected climb gradient during the second climb segment.

7. The apparatus as set forth in claim 6 additionally comprising means for flying the aircraft at the selected airspeed during the first climb segment.

8. A method for adjusting aircraft engine thrust, the method comprising the steps of:
   a. selecting a climb gradient for climbing the aircraft;
   b. flying the aircraft at a first climb attitude during a first climb segment;
   c. reducing a climb attitude of the aircraft at an end of the first climb segment from the first climb attitude;
   d. flying the aircraft at a selected airspeed during a second climb segment;
   e. determining a climb thrust level which is a function of the selected climb gradient;
   f. determining a minimum climb gradient level;
   g. comparing the minimum climb gradient level with the climb thrust level and selecting one of the two such levels which is largest so as to generate a reference thrust level;
   h. sensing an actual thrust level of the engine; and
   i. adjusting the actual thrust level of the engine so that the actual thrust level approaches the reference thrust level.

9. Apparatus for adjusting aircraft engine thrust, the method comprising the steps of:
   a. means for selecting a climb gradient for climbing the aircraft;
   b. means for flying the aircraft at a first climb attitude during a first climb segment;
   c. means for reducing a climb attitude of the aircraft at an end of the first climb segment from the first climb attitude;
   d. means for flying the aircraft at a selected airspeed during a second climb segment;

e. means for determining a climb thrust level which is a function of the selected climb gradient;
f. means for determining a minimum climb gradient level;
g. means for comparing the minimum climb gradient level with the climb thrust level and selecting one of the two such levels which is largest so as to generate a reference thrust level;
h. means for sensing an actual thrust level of the engine; and
i. means for adjusting the actual thrust level of the engine so that the actual thrust level approaches the reference thrust level.

* * * * *